(12) United States Patent
Baweja et al.

(10) Patent No.: US 7,219,217 B1
(45) Date of Patent: May 15, 2007

(54) APPARATUS AND METHOD FOR BRANCH PREDICTION UTILIZING A PREDICTOR COMBINATION IN PARALLEL WITH A GLOBAL PREDICTOR

(75) Inventors: Gunjeet Baweja, Sunnyvale, CA (US); Harsh Kumar, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 838 days.

(21) Appl. No.: 09/174,434

(22) Filed: Oct. 16, 1998

(51) Int. Cl.
*G06F 9/44* (2006.01)
(52) U.S. Cl. .................................... 712/239
(58) Field of Classification Search ............... 712/239, 712/240, 237, 238
See application file for complete search history.

(56) References Cited

U.S. PATENT DOCUMENTS

| | | | |
|---|---|---|---|
| 5,392,410 A | 2/1995 | Liu | |
| 5,548,742 A | 8/1996 | Wang et al. | |
| 5,634,027 A | 5/1997 | Saito | |
| 5,687,360 A * | 11/1997 | Chang | 712/240 |
| 5,758,142 A * | 5/1998 | McFarling et al. | 712/239 |
| 5,764,946 A * | 6/1998 | Tran et al. | 712/239 |
| 5,802,576 A | 9/1998 | Tzeng et al. | |
| 5,978,907 A | 11/1999 | Tran et al. | 712/239 |
| 5,987,599 A | 11/1999 | Poplingher et al. | 712/238 |
| 6,073,230 A | 6/2000 | Pickett et al. | 712/205 |
| 6,079,003 A | 6/2000 | Witt et al. | 711/200 |

OTHER PUBLICATIONS

Webster's II New Riverside Dictionary. Houghton Mifflin Company 1994; pp. 1-3.*
Andrew S. Tanenbaum (Structured Computer Organization), 1990, Third Edition, Simon & Schuter; p. 11.*
McFarling, "Serial Branch Prediction," (Nov. 1996).
Su and Zhou, "A Comparative Analysis of Branch Prediction Schemes," undated.
Evers, Chang and Patt, "Using Hybrid Branch Predictors To Improve Branch Prediction Accuracy In The Presence Of Context Switches,", undated.
Patel, Friendly and Patt, "Critical Issues Regarding The Trace Cache Fetch Mechanism," undated.
Yeh, Marr and Patt, "Increasing The Instruction Fetch Rate via Multiple Branch Prediction And A Branch Address Cache," (Jul. 1993).
S. McFarling, "Combined Branch Predictors," Technical Note TN-36, DEC-WRL. Palo Alto, California, Jun. 1993.15 Pages.
E. Rotenberg et al., "Trace Cache: a low latency approach to high bandwidth instruction fetching". Proceeding of the 29th. International Symposium on Computer Architecture.© 1996, IEEE. pp. 24-35.

* cited by examiner

*Primary Examiner*—Gautam R. Patel
(74) *Attorney, Agent, or Firm*—Blakely, Sokoloff, Taylor & Zafman LLP (57) ABSTRACT

An apparatus and method for branch prediction are disclosed. The branch predictor has four portions. The first includes a bimodal branch predictor in series with a local branch predictor; the second includes a global branch predictor. The first and second portions are in parallel and operate concurrently, and each provide an output received by the fourth portion. The third portion receives address data and selection data, and also provides output to the fourth portion. The fourth portion receives these outputs, and provides a branch prediction. The branch prediction is a selection of either the output from the first portion or the output from the second portion, based upon selection criteria received from the third portion.

22 Claims, 15 Drawing Sheets

APPARATUS AND METHOD FOR BRANCH PREDICTION UTILIZING A PREDICTOR COMBINATION IN PARALLEL WITH A GLOBAL PREDICTOR

BACKGROUND OF THE INVENTION

1. Field of the Invention

This invention relates generally to computers. More particularly, the present invention relates to an apparatus and method for branch prediction.

2. Description of the Related Art

To maximize performance, modern computer designs attempt to execute as many instructions as possible concurrently. To find enough instructions to keep busy, the processors in modern computers use branch prediction to guess which instructions will be executed.

Branch prediction accuracy is a major performance factor in modern computer processor design. To improve branch prediction, various branch prediction strategies have been studied and implemented. See, for example, McFarling, "Serial Branch Prediction" (November 1996); Su and Zhou, "A Comparative Analysis of Branch Prediction Schemes", Computer Science Division, University of California at Berkeley (undated); Evers, Chang, and Patt, "Using Hybrid Branch Predictors to Improve Branch Prediction Accuracy in the Presence of Context Switches", Department of Electrical Engineering and Computer Science, The University of Michigan (undated); Patel, Friendly, and Patt, "Critical Issues Regarding the Trace Cache Fetch Mechanism", Advanced Computer Architecture Laboratory, Department of Electrical Engineering and Computer Science, The University of Michigan (undated); and Yeh, Marr, and Patt, "Increasing the Instruction Fetch Rate via Multiple Branch Prediction and a Branch Address Cache", The 7th ACM International Conference on Supercomputing, Tokyo, Japan (July 1993). The sophisticated branch predictor implementations described in these papers use various different strategies, in various combinations, to achieve greater branch prediction accuracy.

While these branch predictors are satisfactory for state-of-the-art microprocessors, they are not optimum for future processors that will be designed to process many more instructions concurrently, at much higher speeds.

The present invention is directed to overcoming, or at least reducing, these problems, and to provide a branch predictor for future generation microprocessors.

SUMMARY OF THE INVENTION

According to one aspect of the present invention, provided is an apparatus having two branch predictor portions which operate concurrently, that is, in parallel. The first portion includes a series combination of a bimodal branch predictor and a local branch predictor; the second portion includes a global branch predictor. Also included is a third portion which receives address data and selection data. A fourth portion receives input from each of the other portions and, based on those inputs, provides a branch prediction.

According to another aspect of the present invention, a method for branch prediction includes performing, in parallel, two different branch predictions. One includes performing a series combination of a bimodal branch prediction and a local branch prediction and creating a serial branch prediction; the other includes performing a global branch prediction. Then, using certain criteria, either the serial branch prediction or the global branch prediction is chosen as the correct branch prediction.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intent is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in the specification. It will of course be appreciated that in the development of any such actual embodiment, numerous implementation-specific decisions must be made to achieve the developer's specific goals, such as compliance with system-related and business-related strengths, which will vary from one implementation to another. Moreover, it will be appreciated that such a development effort might be complex, and time-consuming, but would nevertheless be a routine undertaking for those of ordinary skill in the art having the benefit of this disclosure.

The present invention permits branch predictions to be performed accurately and quickly, even in future-generation multi-bundle machines operating at multiple gigahertz frequencies. While branch prediction accuracy is important, in future-generation microprocessors timing will become more important than it is in present state-of-the-art processors. Thus an important design question for future-generation processors is what level of prediction accuracy can be achieved in a given time budget. The branch predictor of the present invention will provide high accuracy, at very high speeds, in a four bundle machine; the known prior art branch predictors, for example, those described in the papers referenced above, are not believed capable of such high speed, high accuracy operation. Nevertheless, certain aspects of those prior art branch predictors may be used as building blocks, when used in accordance with the teachings of the present invention.

Known prior art branch predictors have, understandably, developed along a path of improved accuracy. That is, branch prediction strategies have become more and more sophisticated for the purpose of improving branch prediction accuracy. The resulting known prior art branch predictor designs have, in turn, become more and more sophisticated, and their branch prediction accuracy has become greater and greater. But these strategies and designs having timing requirements believed to be different from those needed for future-generation multi-bundle, super high speed machines.

We believe that the multi-bundle, super high speed machines of the future require a branch predictor scheme that will achieve acceptable prediction accuracy arrived at in a given time budget conducive to such super high speed operation. This is achieved, according to the present invention, by using various branch predictor building blocks in a new series-parallel arrangement. Before our new arrangement is described in more detail, certain of the individual known building blocks which may be used in our new arrangement will briefly be described.

Referring now to the drawings, and in particular to FIGS. 1a–1j, illustrated are various known branch predictors. See, for example, the McFarling paper entitled "Serial Branch Prediction" referenced above.

Figure 1A:
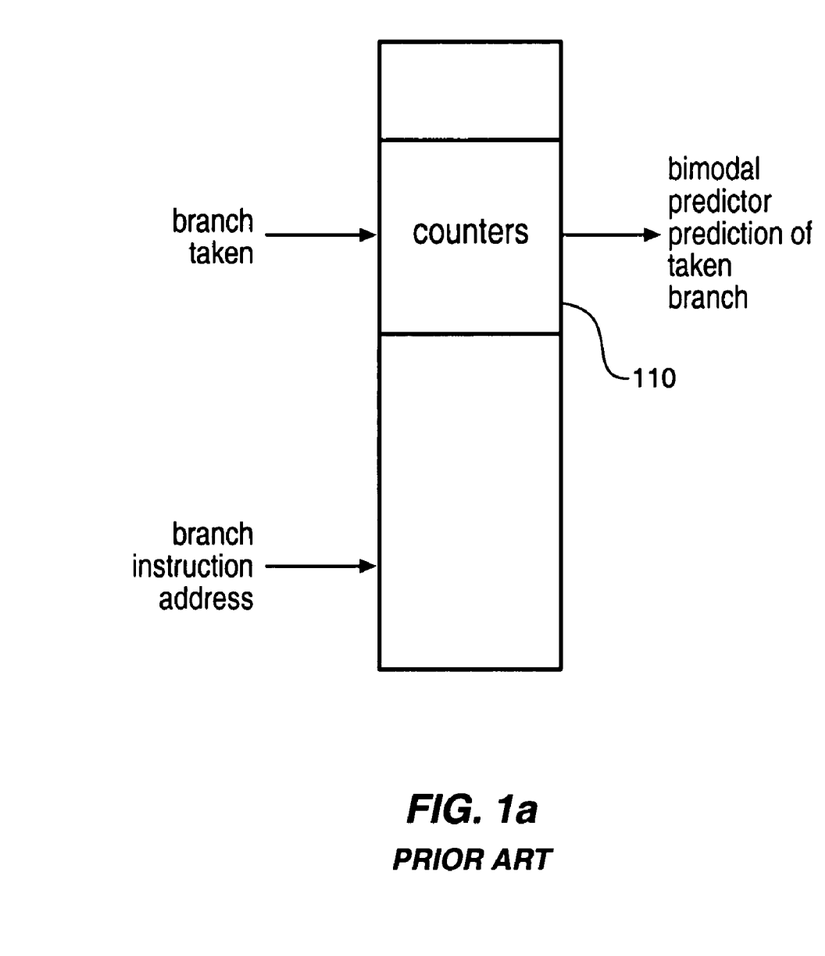
FIGS. 1*a*–1*j* illustrate various prior art branch predictors, which may be used as building-blocks in the present invention.

FIG. 1a illustrates a bimodal branch predictor having an array of a 2-bit saturating counters 110. The counters are indexed by the low order bits of the branch instruction address. The address counter takes as input the direction the branch goes, where 1 represents a taken branch, and 0 represents a non-taken branch. When the branch is taken, the counter counts up; when the branch is not taken, the counter counts down. The counter saturates, and never counts below 0 or above 3. The most significant bit of the counter is used as the branch prediction value. The counter normally predicts whichever branch direction is more frequent. The 2 bits keep the prediction going the same direction even if the branch goes the unlikely direction one time. If the branch goes the unlikely direction twice in a row, then the predicted direction will reverse. This allows the predictor to adapt relatively quickly to new programs or new phases of execution with different branches. Because a bimodal predictor needs only 2 bits per branch, its physical size is relatively small.

Figure 1B:
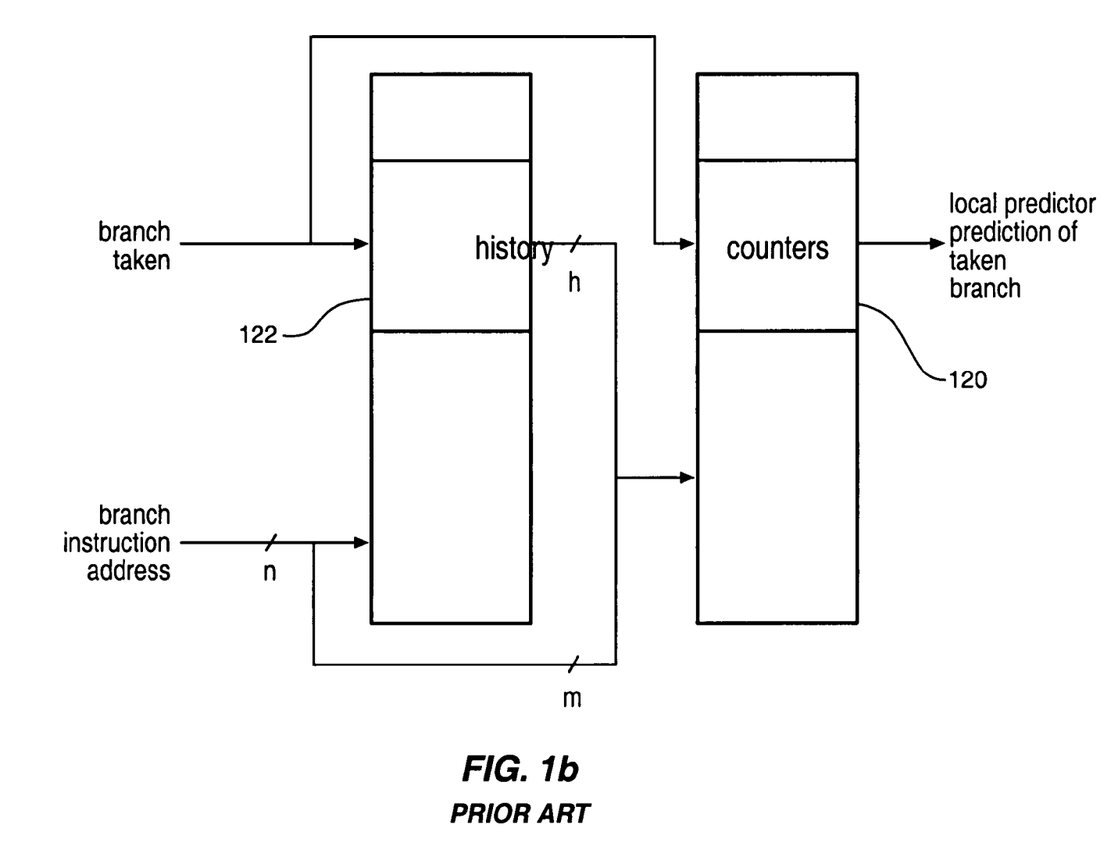

Referring now to FIG. 1b, illustrated is a local branch predictor. The local predictor improves on the prediction accuracy of the bimodal prediction by recognizing that many branches have patterns in their execution. Certain branches execute repetitive patterns which can be detected if the immediate history of the branch is known. For this reason, in the local predictor, certain immediate history data is stored. The illustrated local predictor uses an array of 2-bit counters 120 to make the prediction. The counters are indexed not only by the low order branch instruction address bits (as in the bimodal predictor), but also by the recent history of the branch. The recent history is stored in an array 122, which contains shifted history values indexed by low order bits of the branch instruction address; after a branch is executed, the direction taken is shifted into the appropriate history entry, and the oldest history bit is shifted out and discarded. A local predictor generally is significantly larger in physical size than a bimodal predictor, due to its use of the stored history array.

Figure 1C:
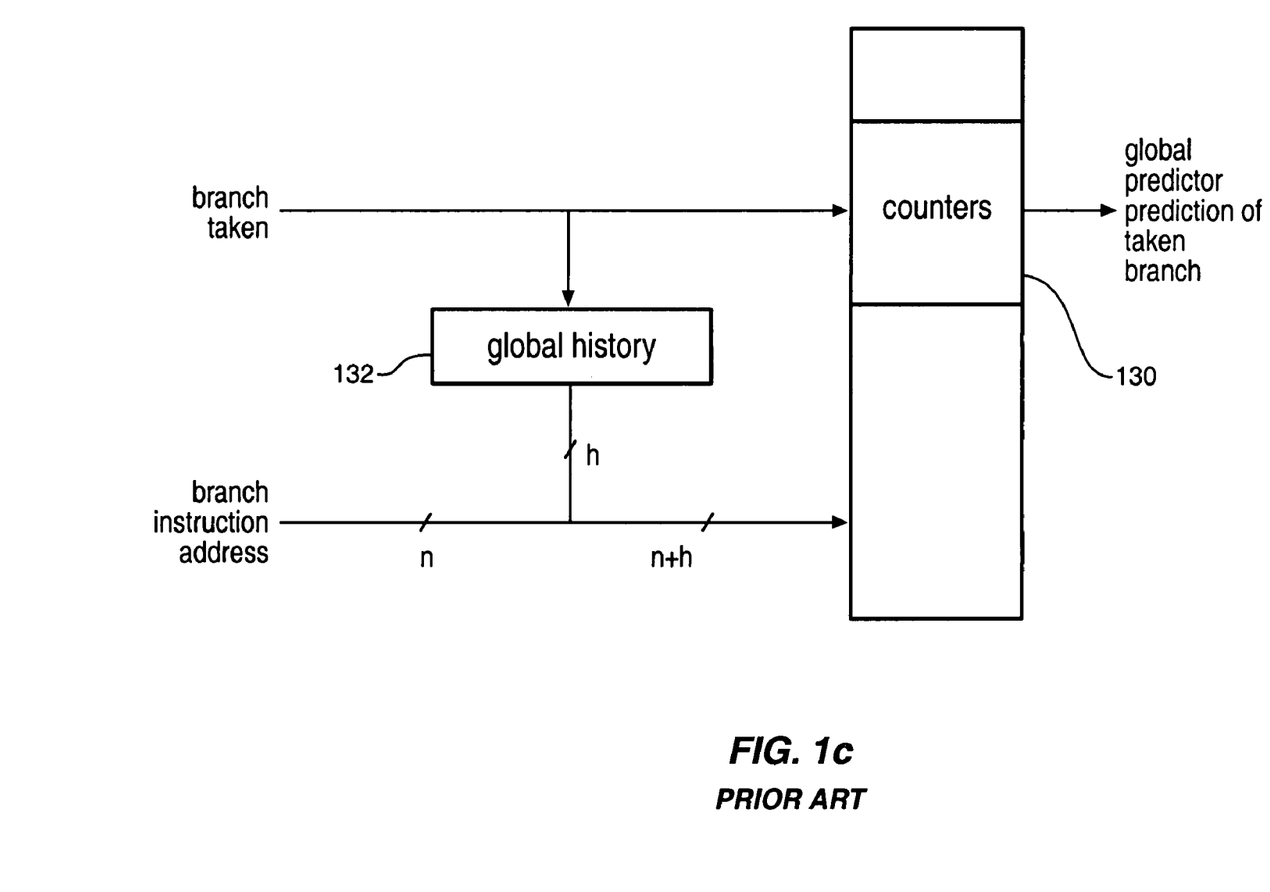

Referring now to FIG. 1c, a global branch predictor is illustrated. The global predictor improves the accuracy of the local predictor by making use of the history of all recent branches. The global predictor is similar to the local predictor and uses an array of 2-bit counters 130, but also has a history register 132 global to all branches.

Figure 1D:
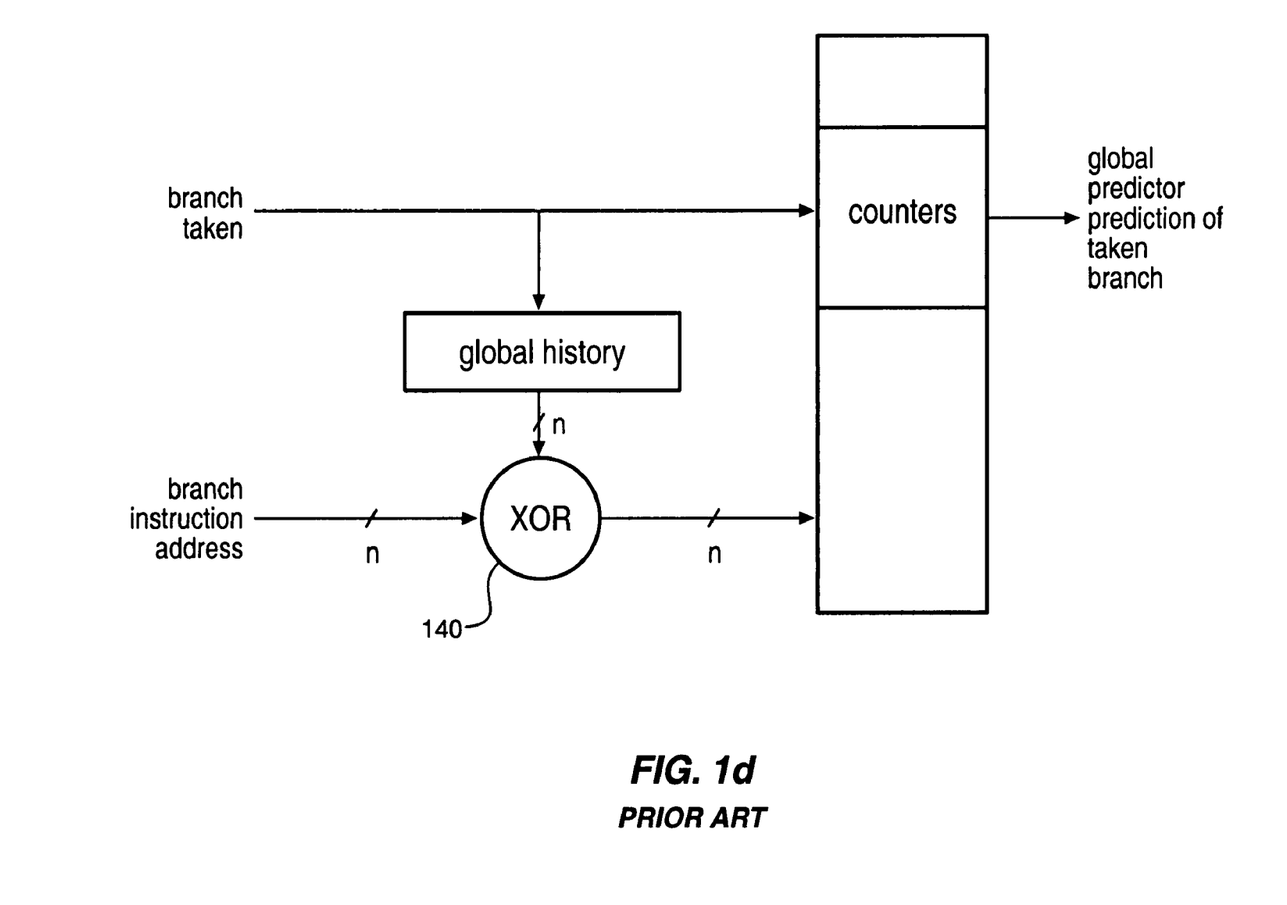
Figure 1E:
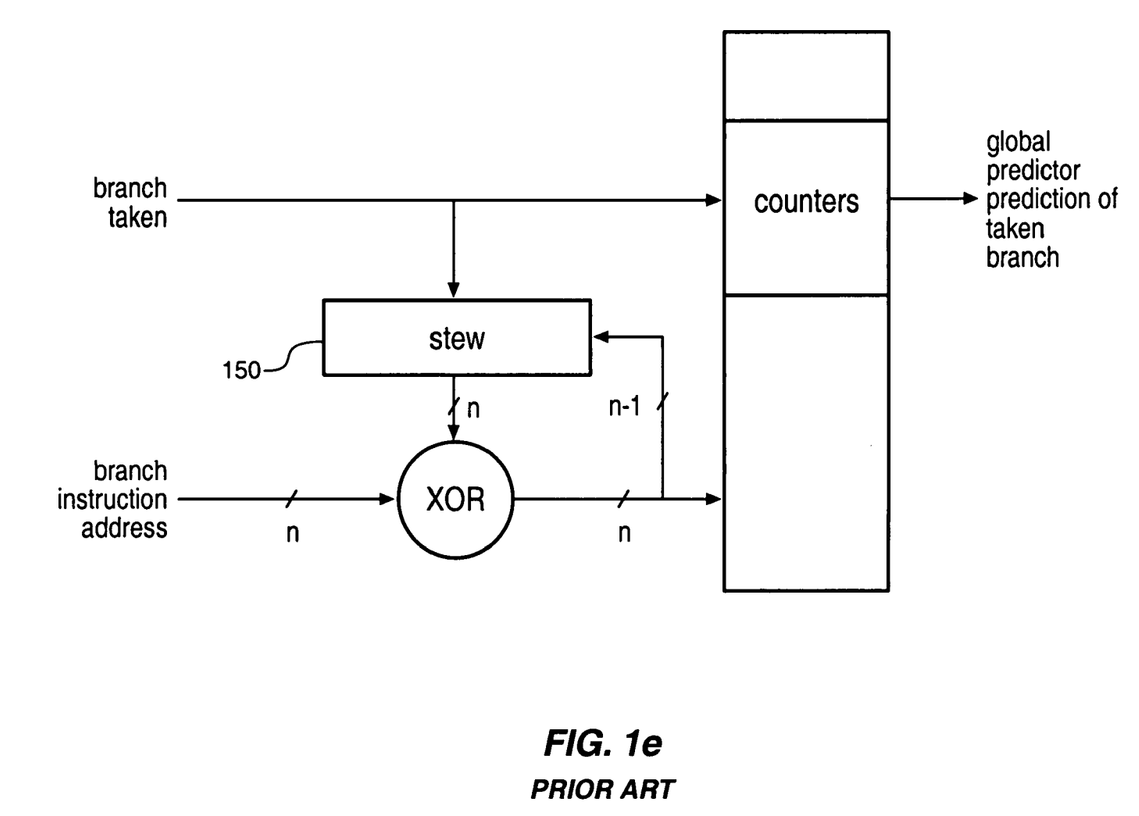

FIGS. 1d and 1e illustrate improved global branch predictors. Referring first to FIG. 1d, the global branch prediction accuracy can be improved somewhat by XORing the global history with the branch address 140. Referring now to FIG. 1e, the global branch predication accuracy can be further improved by using what is sometimes called a "stew" register 150, which contains path information. This global predictor takes advantage of the observation that branches can be dependent on the path taken to reach them; accordingly, by saving data regarding the path, branch prediction accuracy can be improved.

The bimodal predictor, the local predictor, and the global predictor are each building blocks that can be used to implement more sophisticated branch predictors.

Figure 1F:
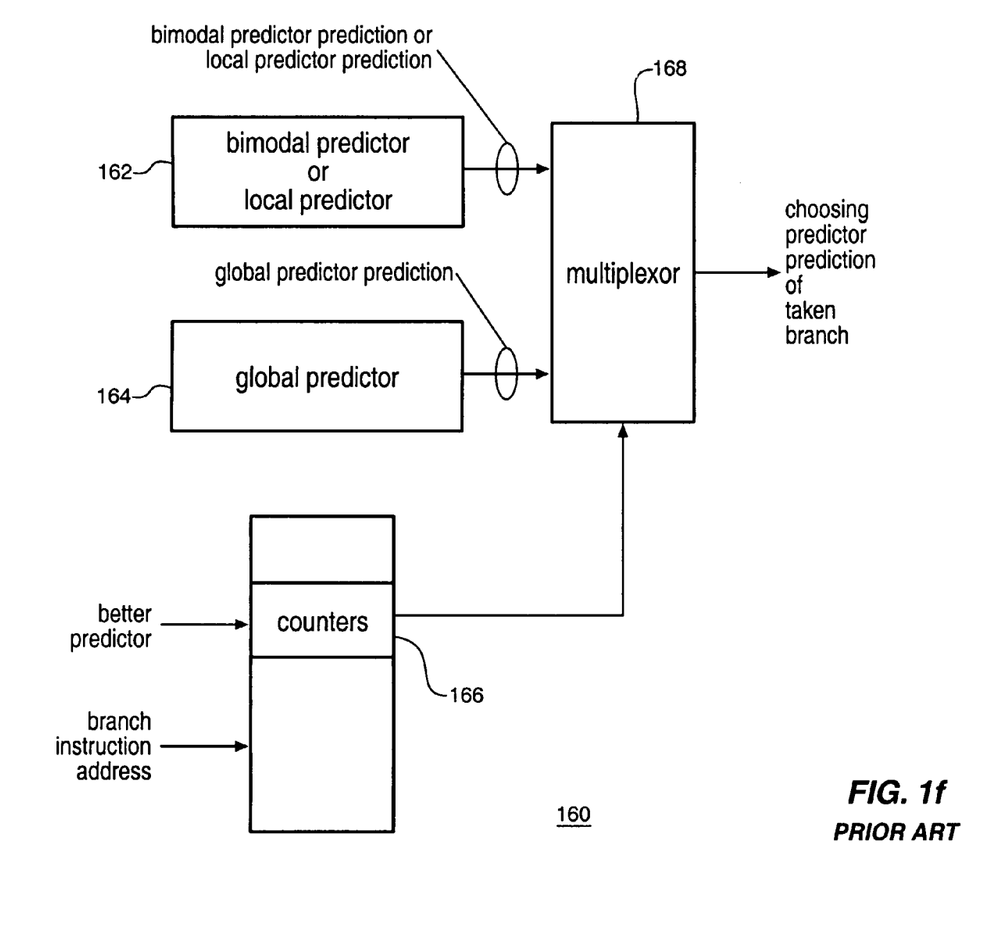
Figure 1G:
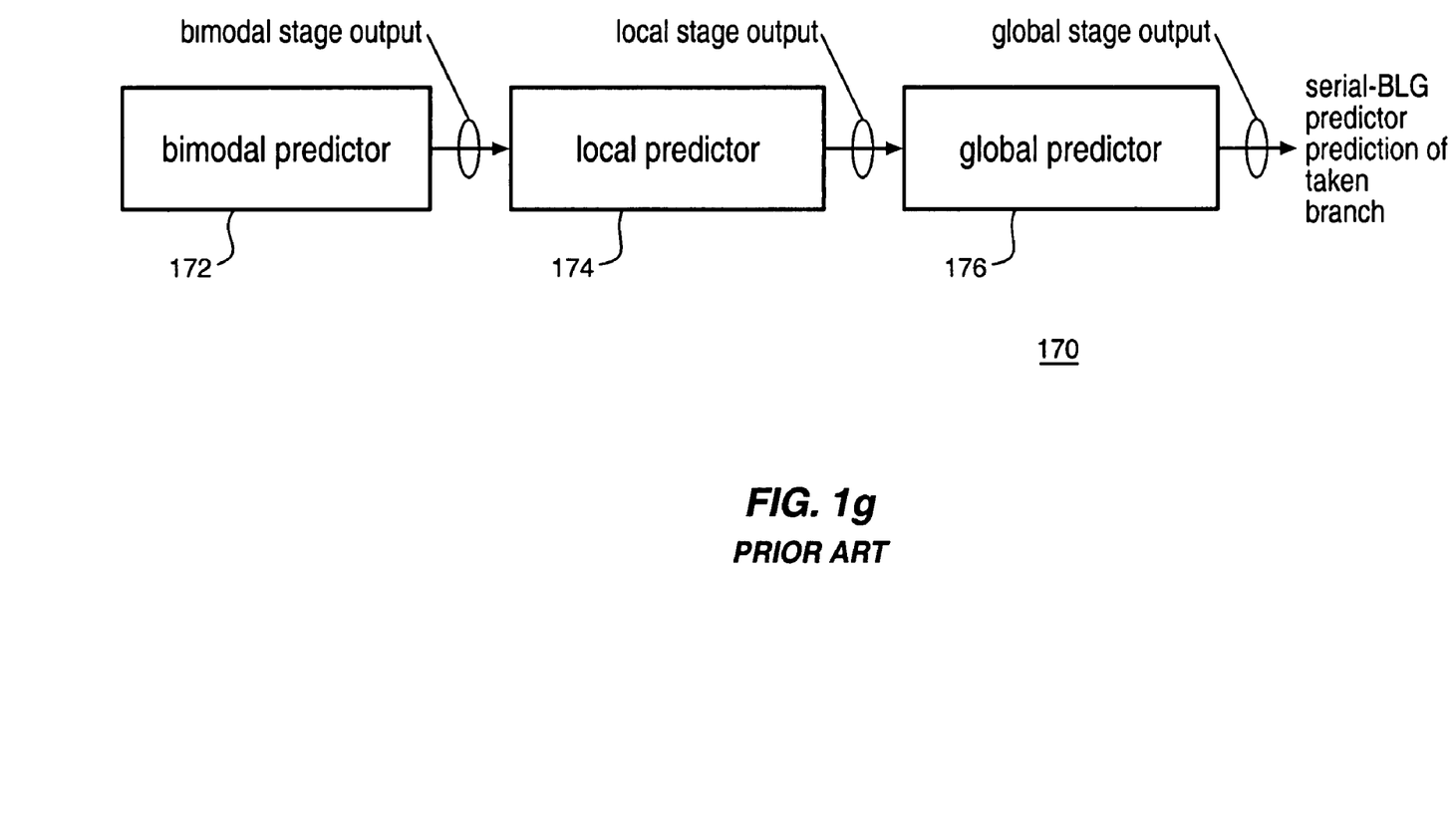

Illustrated in FIGS. 1f and 1g are two known branch predictors using various of these building blocks in various combinations.

Referring first to FIG. 1f, illustrated is a choosing predictor 160 having two predictor portions in parallel. The first portion 162 includes either a bimodal predictor or a local predictor. The second portion 164 includes a global predictor. Thus the choosing predictor 160 combines a global predictor with either a bimodal predictor or a local predictor. According to the art, a bimodal predictor works better at small sizes, and a local predictor works better at large sizes.

In addition to the two predictors, that is, the predictor in the first portion, and the global predictor in the second portion, the choosing predictor 160 also includes an array of 2-bit counters 166 that keep track of whether the first portion predictor or the second portion predictor performs better for each branch. Based on this count value, the better prediction is chosen by a multiplexor 168.

Figure 1H:
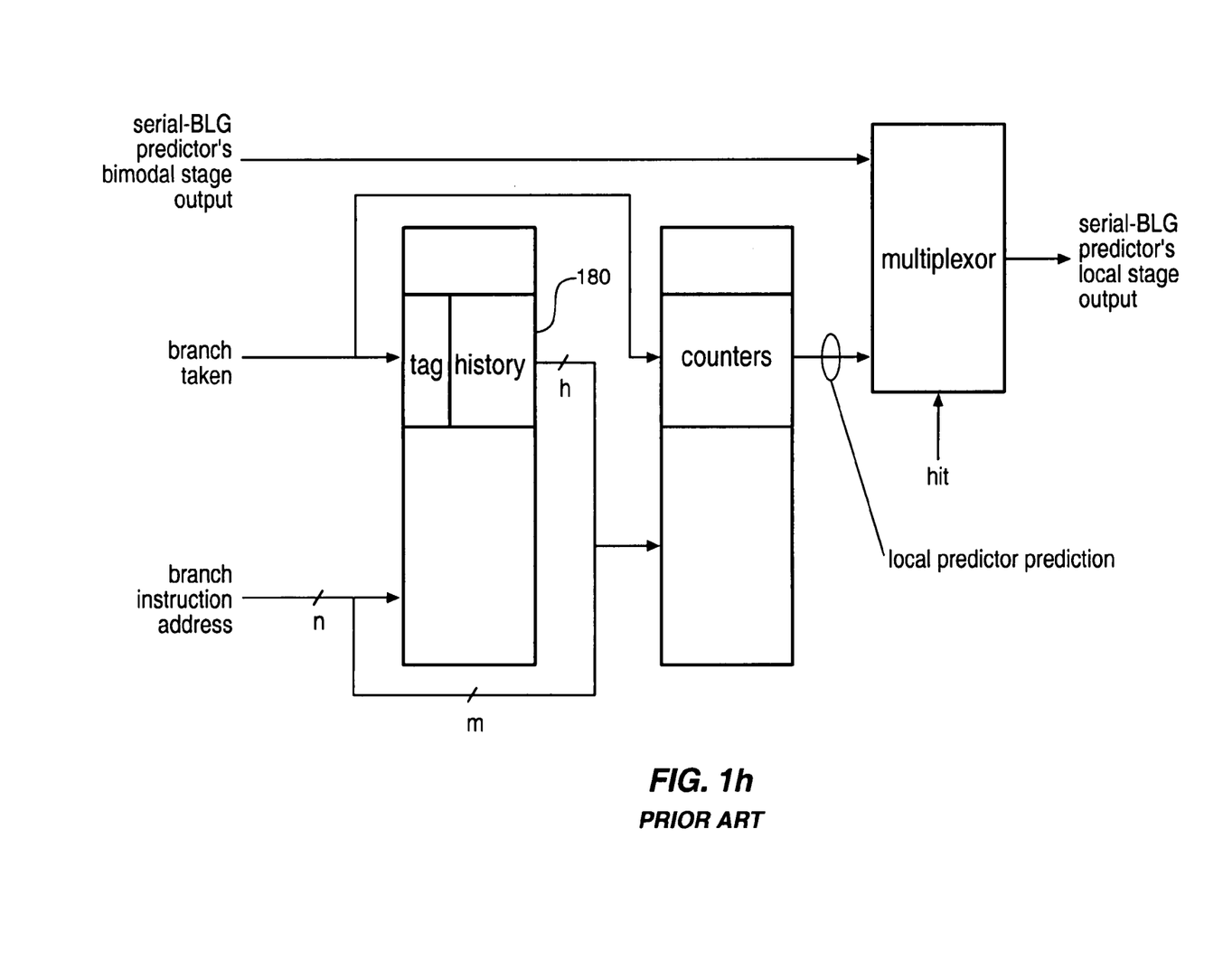
Figure 1I:
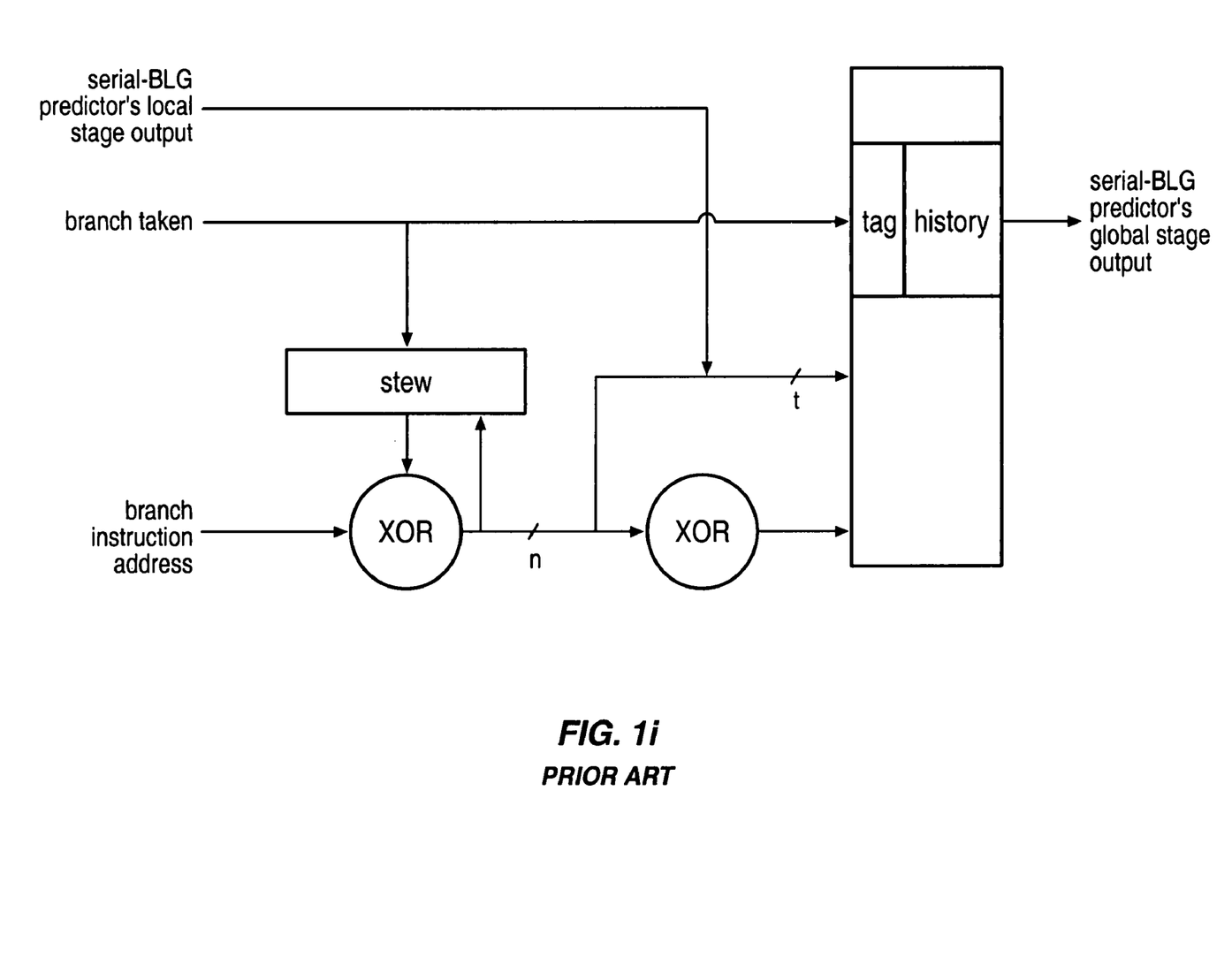
Figure 1J:
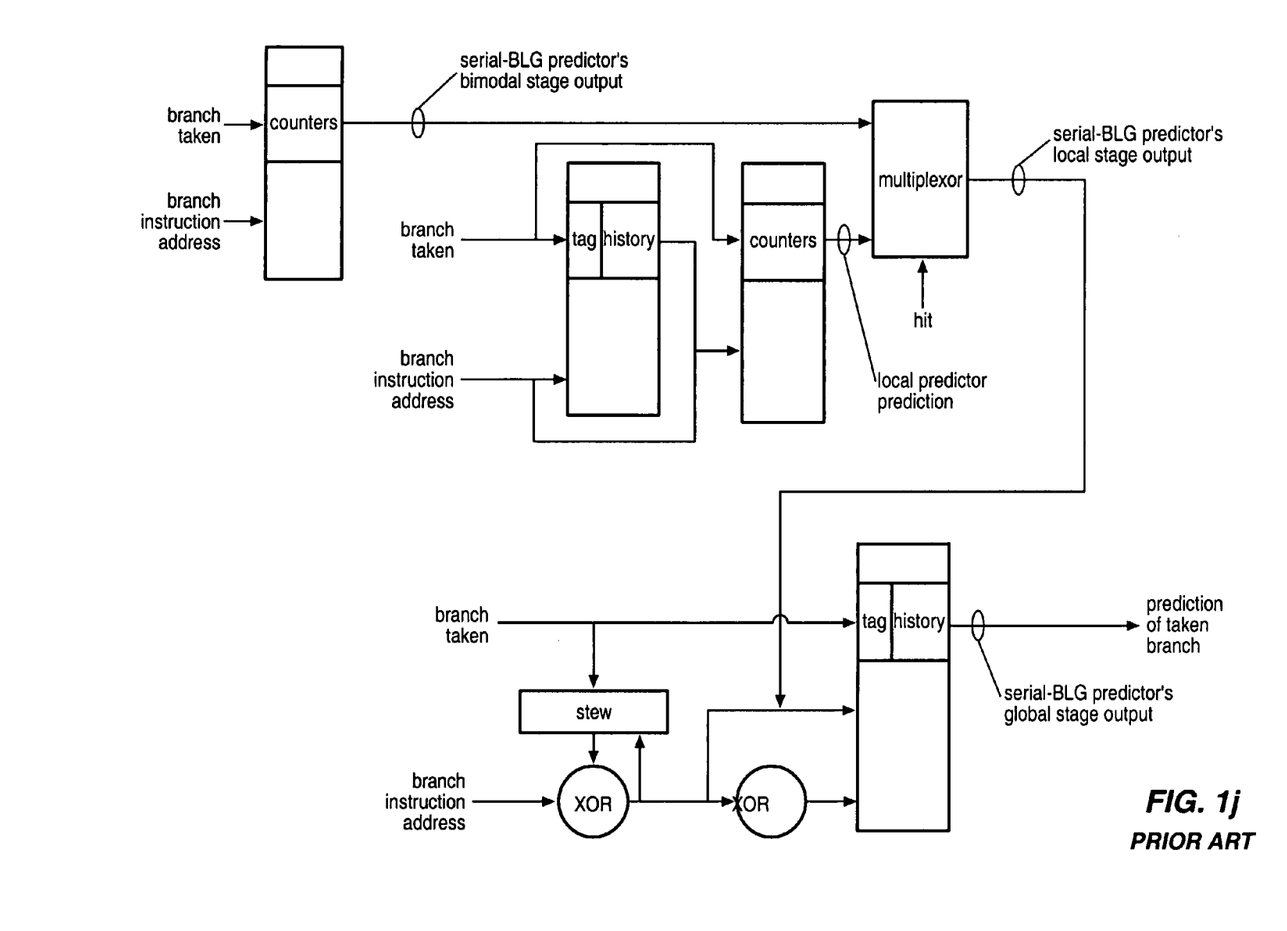

Referring next to FIG. 1g, illustrated is a branch predictor 170, sometimes called a serial-BLG predictor, having a series combination of a bimodal predictor 172, a local predictor 174, and a global predictor 176. FIG. 1h illustrates in more detail the local predictor stage 174 of a particular embodiment of the serial-BLG predictor 170 of FIG. 1g, and FIG. 1i illustrates in greater detail the global predictor stage 176 of a particular embodiment of the serial-BLG predictor 170 of FIG. 1g. FIG. 1j illustrates the serial-BLG predictor 170 of FIG. 1g in greater detail.

In the serial-BLG predictor embodiment illustrated in FIGS. 1g–1j, the fast adaptability of the first stage, the bimodal predictor stage 172, allows the serial-BLG predictor 170 to adapt quickly. The first stage covers the most common cases in a small physical size, allowing the second and third stages, 174, 176, to be designed to handle only those cases where the first stage prediction is wrong.

Referring now to FIG. 1h, because only selected history data is stored in history table 180, conflicts can occur between branches for entries in the history table; a conflict occurs whenever two branches have the same address bits used to access the history table. Conflicts can be reduced by increasing the number of counters, but this of course also increases the physical size of the branch predictor. Recognizing that when there is no conflict for a history table entry, a local prediction is generally better than a bimodal prediction, the embodiment illustrated in FIG. 1h uses the local prediction when there is a "hit" in the local history table, and uses the bimodal prediction when there is not.

Certain of the predictors that have been briefly described in conjunction with FIGS. 1a–1h may be used as building blocks in implementing the present invention.

The present invention provides for a new series-parallel combination of predictor building blocks, resulting in a branch predictor which can predict with reasonable accuracy, at much higher speeds.

Figure 2:
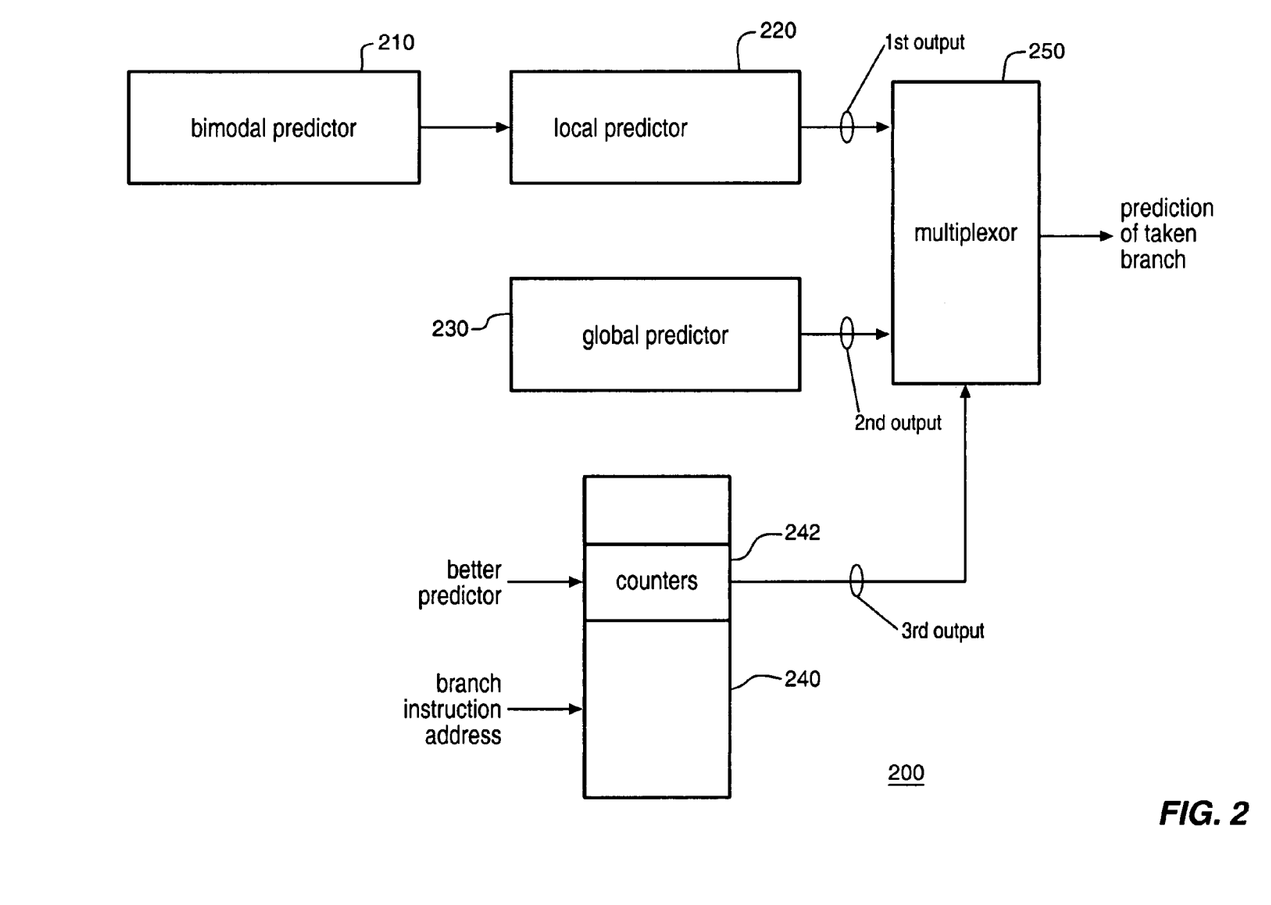
FIG. 2 illustrates a branch predictor according to the present invention.

Referring now to FIG. 2, illustrated is a branch predictor 200 according to one aspect of the present invention. The branch predictor includes a bimodal predictor 210 in series with a local predictor 220. This series combination forms a first portion of the branch predictor 200, and has a first output, described more fully below. The bimodal predictor 210 may be similar to the bimodal predictor illustrated in FIG. 1a, but need not be; it need simply perform a bimodal prediction. Similarly, the local predictor 220 may be similar to that illustrated in FIG. 1b or in FIG. 1h, but need not be; it need simply perform a local prediction.

With continued reference to FIG. 2, a global predictor 230 forms a second portion of present branch predictor 200, and has a second output. The global predictor 230 may be similar to the global predictor illustrated in any of FIGS. 1c–1e, but need not be; it need simply perform a global prediction.

The embodiment of the present invention illustrated in FIG. 2, further includes a portion 240 having an array of 2-bit counters 242. The portion 240 receives certain data regarding a branch instruction address. The data includes a branch instruction address. It also includes information regarding which has been the better prediction in the past, that is, whether the second output of the global predictor 230, or the first output of the series combination of the bimodal predictor 210 and the local predictor 220 has, in the past, been the better prediction.

With continued reference to FIG. 2, included also is a multiplexor 250. The multiplexor 250 receives both the first and second outputs, and also a third output from the portion 240. With these outputs, the multiplexor 250 outputs a prediction of what the taken branch should be. This prediction is made by selecting either the first output or the second output, based upon the third output.

Figure 3A:
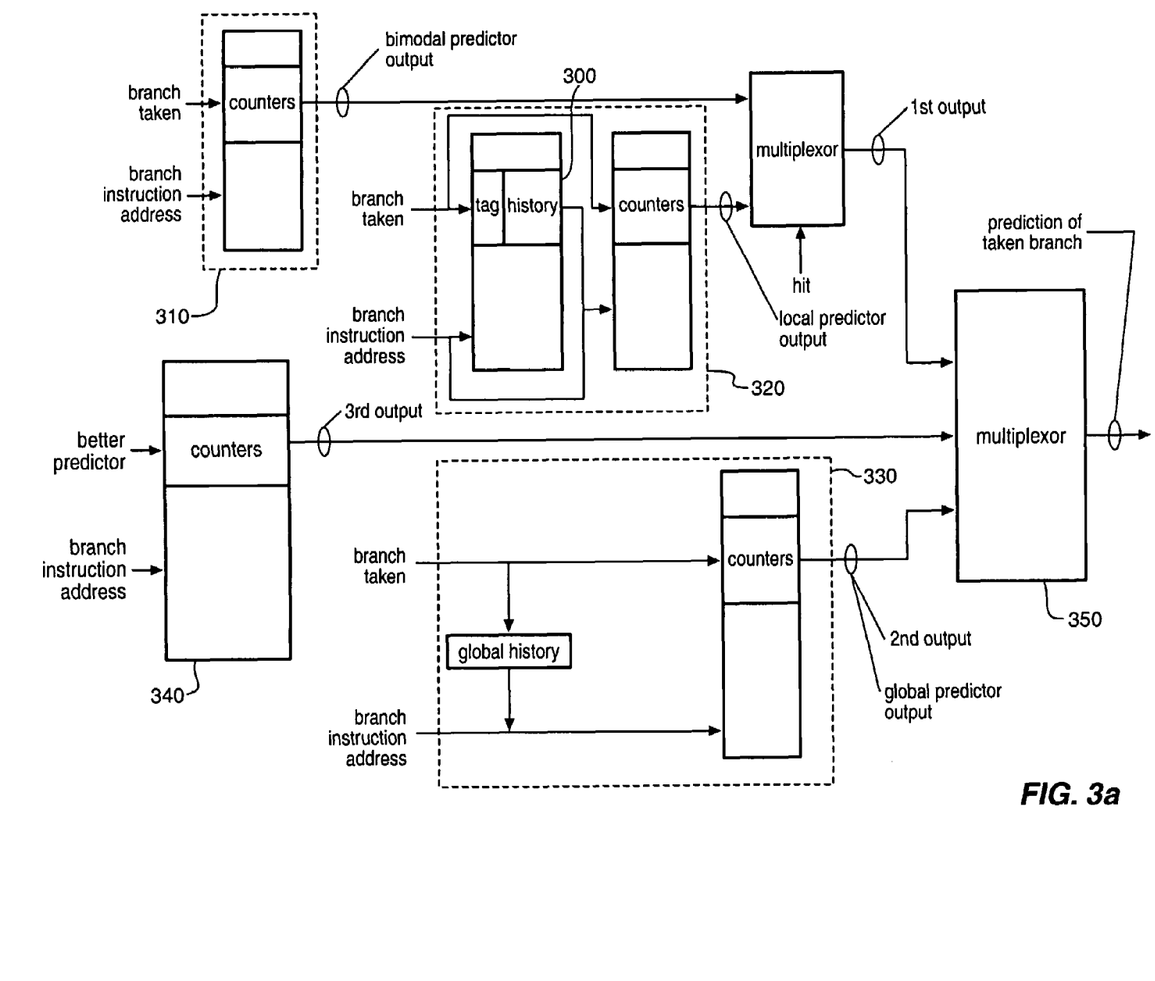
FIGS. 3*a*, 3*b*, and 3*c* illustrate, in greater detail, various embodiments of a branch predictor according to the present invention.
Figure 3B:
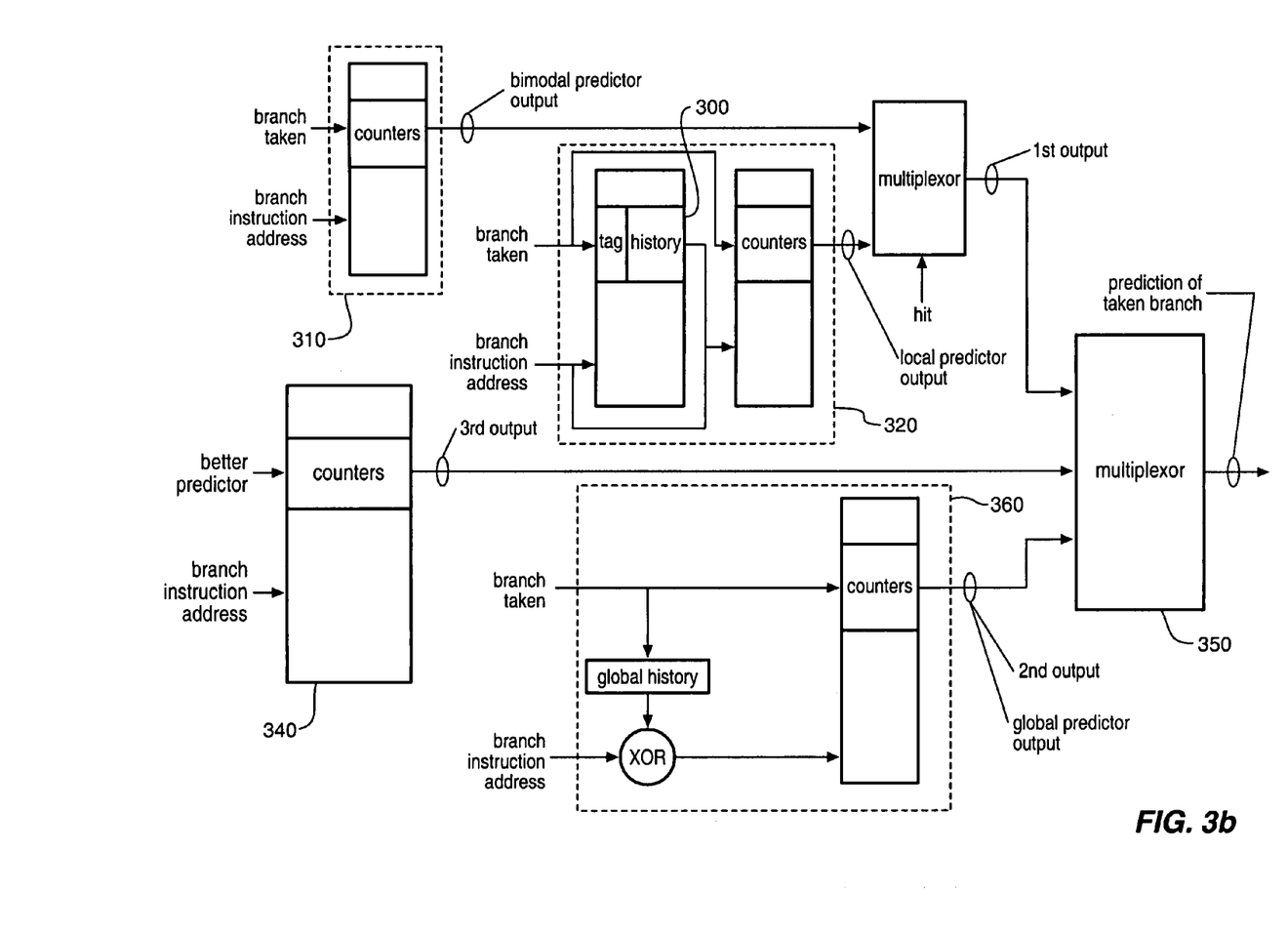
Figure 3C:
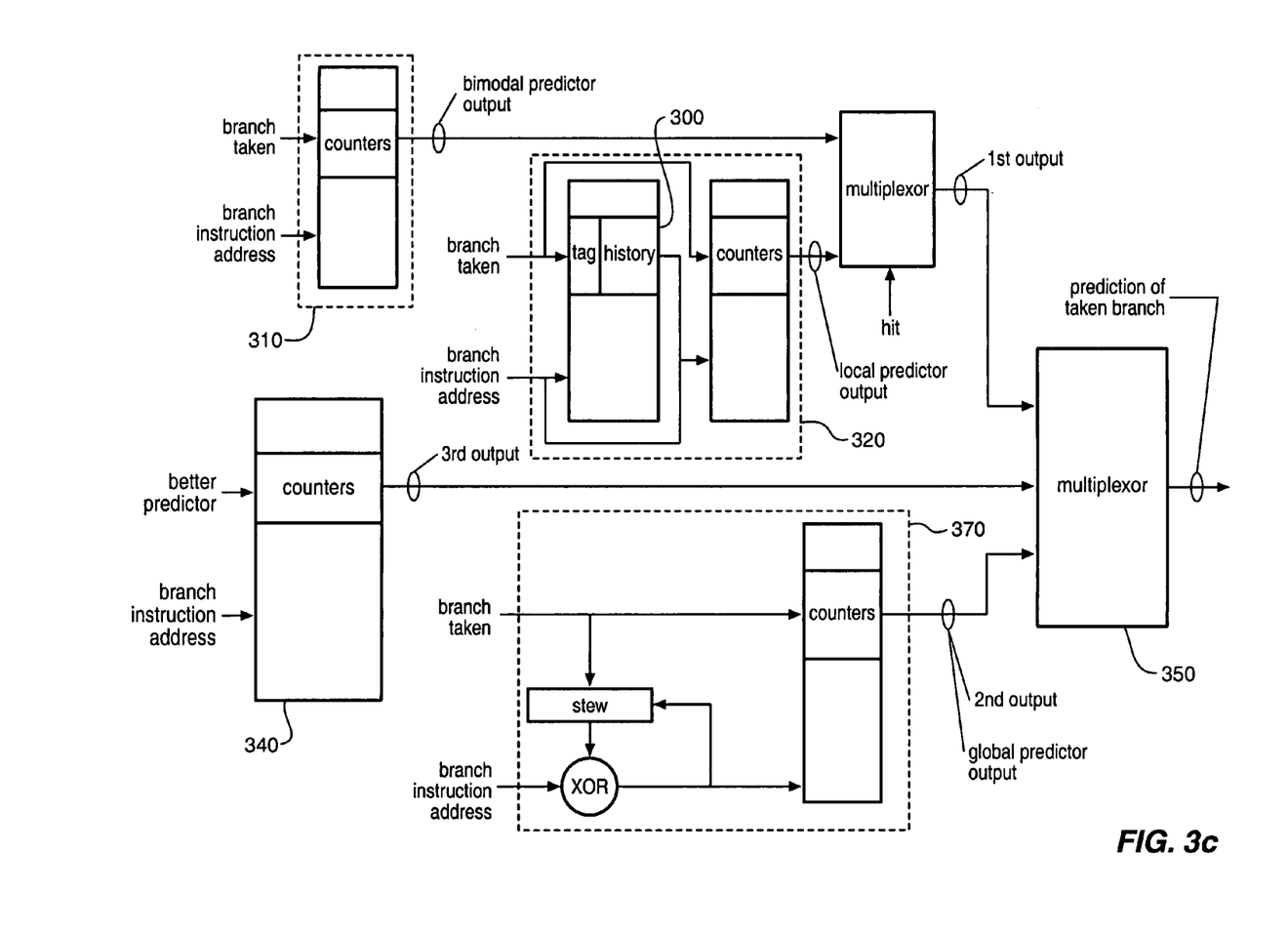

FIGS. 3a, 3b, and 3c illustrate various different embodiments according to different aspects of the present invention, using various of the building blocks illustrated in FIGS. 1a–1i. Notice how each of the embodiments illustrated in FIGS. 3a, 3b, and 3c differ from the branch predictor illustrated in FIG. 1j.

In the embodiments illustrated in FIGS. 3a–3c, the first output is either the bimodal prediction of the bimodal prediction 310 or the local prediction of the local prediction 320. The local prediction is used when there is a "hit" in the local history table 300, and the bimodal prediction is used when there is not.

With continued reference to 3a–3c, the second output is the global prediction of the global 330, 360 and 370 respectively. The third output includes information regarding whether the first output or the second output has, in the past, been the better predictor. Using these inputs, the multiplexor 350 selects either the first output (which is either the local prediction or the bimodal prediction) or the second output (which is the global prediction) as the prediction of the taken branch.

As will be apparent to those skilled in the art having benefit of the present teachings, any desired bimodal predictor structure may be used for the bimodal predictor 310, any desired local predictor may be used for the local predictor 320, and any desired global predictor may be used for the global 330, 360 and 370 respectively. Similarly, any desirable selecting structure may be used for the multiplexor 350.

Figure 4:
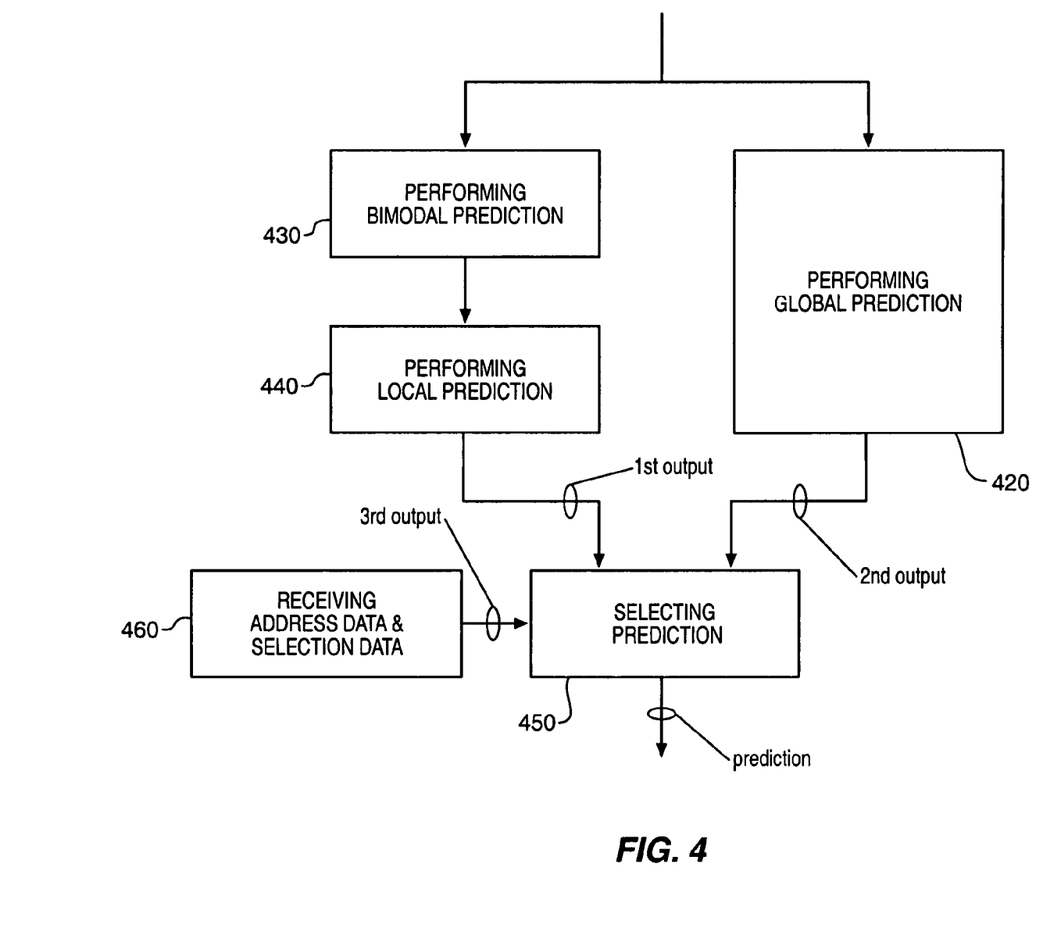
FIG. 4 illustrates the logic flow of a branch predictor method according to the present invention.

Referring now to FIG. 4, illustrated is a branch selection method according to one aspect of the present invention. A global prediction is performed at processing block 420. Concurrently with performing the global prediction, a series combination prediction is performed, which includes performing a bimodal prediction at processing block 430 and performing a local prediction at processing 440. Thereafter, a selection is made, choosing the output of one or the other of the two concurrently performed predictions at processing block 450, based upon received addressed data and selection data at processing block 460.

The particular embodiments disclosed above are illustrative only, as the invention may be modified and practiced in different but equivalent manners apparent to those skilled in the art having the benefit of the teachings herein. Furthermore, no limitations are intended to the details of construction herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An apparatus comprising:
   a first portion including a bimodal branch predictor and a local branch predictor;
   a second portion in parallel with the first portion, the second portion including a global branch predictor.

2. The apparatus of claim 1, further comprising:
   a third portion to receive address data and selection data; and
   a fourth portion to receive input from the first portion, the second portion, and the third portion, and to provide a branch prediction.

3. The apparatus of claim 2, wherein the third portion comprises an array of 2-bit counters, and wherein the fourth portion comprises a multiplexor.

4. An apparatus comprising:
   a first branch predictor portion including a bimodal branch predictor and a local branch predictor, the first branch predictor portion to provide a first output;
   a global branch predictor in parallel with the first branch predictor portion to provide a second output.

5. The apparatus of claim 4, further comprising:
   a first portion to receive data regarding a branch instruction address, and to provide a third output; and
   a second portion to receive the first output, the second output, and the third output, and to provide an output representative of a branch to be taken.

6. The apparatus of claim 5, wherein the first portion comprises an array of 2-bit counters, and wherein the second portion comprises a multiplexor.

7. The apparatus of claim 5, wherein the data regarding the branch instruction address comprises:
   a branch instruction address; and
   data regarding whether previously the first branch predictor portion or the second branch predictor portion performed better for the branch instruction address.

8. An apparatus comprising:
   a first portion including a bimodal branch predictor means and a local branch predictor means; and
   a second portion in parallel with the first portion, the second portion including a global branch predictor means.

9. The apparatus of claim 8, further comprising:
   a third portion comprising an array of 2-bit counters to receive address data and selection data; and a multiplexor to receive input from the first portion, the second portion, and the third portion, and to provide a branch prediction.

10. A method comprising:
    performing a global branch prediction;
    performing, in parallel with said performing the global branch prediction, a bimodal branch prediction and a local branch prediction.

11. The method of claim 10, further comprising:
receiving address data and selection data; and
creating a branch prediction using the global branch prediction, the bimodal branch prediction, the local branch prediction, the address data, and the selection data.

12. The method of claim 11, further comprising, in parallel with said performing the global branch prediction, selecting the local branch prediction if there is a hit in a local history table of a local predictor, otherwise selecting the bimodal branch prediction.

13. A method comprising:
performing, in parallel,
a bimodal branch prediction and a local branch prediction, and selecting either the bimodal branch prediction or the local branch prediction, and
a global branch prediction; and
selecting either the selected prediction or the global branch prediction.

14. The method of claim 13, wherein said selecting either the bimodal branch prediction or the local branch prediction comprises selecting the local branch prediction if there is a hit in a local history table of a local predictor, otherwise selecting the bimodal branch prediction.

15. A method comprising:
performing a bimodal branch prediction and creating a bimodal output;
performing a local branch prediction and creating a local output;
creating a first branch prediction by using the bimodal output and the local output;
in parallel with said performing the bimodal branch prediction, said performing the local branch prediction, and said creating the first branch prediction, performing a global branch prediction and creating a second branch prediction; and
selecting either the first branch prediction or the second branch prediction.

16. The method of claim 15, wherein said performing the local branch prediction and said creating the local output comprises storing local history data.

17. The method of claim 16, wherein said creating the first branch prediction comprises selecting either the bimodal output or the local output as the first branch prediction, using the local history data.

18. The method of claim 15, further comprising storing history data regarding the first branch prediction and the second branch prediction.

19. The method of claim 18, wherein said selecting either the first branch prediction or the second branch prediction comprises using the history data regarding the first branch prediction and the second branch prediction in making the selection.

20. A method comprising:
performing a bimodal branch prediction;
performing a local branch prediction;
selecting either the bimodal branch prediction or the local branch prediction; and
concurrently with at least one of said performing the bimodal branch prediction, said performing the local branch prediction, or said selecting, performing a global branch prediction.

21. The method of claim 20, further comprising selecting either the selected branch prediction or the global branch prediction based on information indicating whether, in the past, the selected branch prediction or the global branch prediction has been a better predictor.

22. The method of claim 20, wherein said selecting either the bimodal branch prediction or the local branch prediction comprises selecting the local branch prediction if there is a hit in a local history table of a local predictor, otherwise selecting the bimodal branch prediction.

* * * * *